United States Patent
Feistel et al.

(10) Patent No.: US 7,815,193 B2
(45) Date of Patent: Oct. 19, 2010

(54) DRY-RUNNING PISTON ROD SEALING ARRANGEMENT, AND METHOD FOR SEALING A PISTON ROD USING ONE SUCH ARRANGEMENT

(75) Inventors: Norbert Feistel, Ellikon a.d. Thur (CH); Georg Samland, Oehningen (DE)

(73) Assignee: Burckhardt Compression AG, Winterthur (CH)

( * ) Notice: Subject to any disclaimer, the term of this patent is extended or adjusted under 35 U.S.C. 154(b) by 642 days.

(21) Appl. No.: 11/664,772

(22) PCT Filed: Oct. 24, 2005

(86) PCT No.: PCT/EP2005/055494

§ 371 (c)(1),
(2), (4) Date: Apr. 4, 2007

(87) PCT Pub. No.: WO2006/042866

PCT Pub. Date: Apr. 27, 2006

(65) Prior Publication Data

US 2009/0121440 A1    May 14, 2009

(30) Foreign Application Priority Data

Oct. 22, 2004   (EP)  ............................ 04405656

(51) Int. Cl.
*F16J 15/447* (2006.01)
*F16J 9/12* (2006.01)

(52) U.S. Cl. ................. 277/303; 277/317; 277/413; 277/581; 277/545; 277/470

(58) Field of Classification Search ......... 277/318–321, 277/413, 545, 303, 317, 581, 470, 467, 468
See application file for complete search history.

(56) References Cited

U.S. PATENT DOCUMENTS

| 2,175,868 | A | * | 10/1939 | Bentley | ........................ 277/543 |
| 2,329,955 | A | * | 9/1943 | Summers | ..................... 277/534 |
| 3,542,374 | A | * | 11/1970 | Neilson et al. | ............... 277/584 |
| 3,722,895 | A | * | 3/1973 | Mevissen | ..................... 277/583 |
| 4,447,063 | A | * | 5/1984 | Kotzur et al. | ................ 277/304 |
| 4,448,425 | A | * | 5/1984 | von Bergen | ................... 277/545 |
| 4,643,437 | A | * | 2/1987 | Salant et al. | ................. 277/319 |
| 4,691,276 | A | * | 9/1987 | Miller et al. | ................... 700/47 |
| 4,722,534 | A | * | 2/1988 | Wentworth | ................... 277/306 |
| 5,238,308 | A | * | 8/1993 | Lang et al. | ...................... 384/1 |

(Continued)

FOREIGN PATENT DOCUMENTS

DE      3117603 A1    11/1982

(Continued)

*Primary Examiner*—Alison K Pickard
(74) *Attorney, Agent, or Firm*—Townsend and Townsend and Crew, LLP

(57) ABSTRACT

The invention relates to a dry-running piston rod sealing arrangement (1) for sealing a piston rod (2) mounted in a longitudinally displaceable manner. The sealing arrangement comprises at least one sealing ring (5) having a sealing surface (5a), an actuator (7), a sensor (8), and a chamber ring (3) containing the sealing ring (5). The actuator (7) comprises an active connection in relation to the sealing ring (5), such that the sealing surface (5a) can be radially displaced in relation to the piston rod (2). The actuator (7) can be controlled according to a measuring value detected by the sensor (8).

19 Claims, 7 Drawing Sheets

U.S. PATENT DOCUMENTS

| | | | |
|---|---|---|---|
| 6,003,872 A * | 12/1999 | Nord | 277/317 |
| 6,220,602 B1 | 4/2001 | Webster et al. | |
| 6,457,722 B1 * | 10/2002 | Feistel | 277/493 |
| 6,588,764 B2 * | 7/2003 | Fuller | 277/547 |
| 6,615,639 B1 * | 9/2003 | Heinzen | 73/7 |
| 6,786,487 B2 * | 9/2004 | Dinc et al. | 277/355 |
| 6,840,519 B2 * | 1/2005 | Dinc et al. | 277/413 |
| 6,860,485 B2 * | 3/2005 | Masuyama et al. | 277/434 |
| 6,976,680 B2 * | 12/2005 | Uehara et al. | 277/355 |
| 7,066,470 B2 * | 6/2006 | Turnquist et al. | 277/413 |
| 7,405,818 B2 * | 7/2008 | Heinzen | 356/246 |
| 2006/0208427 A1 * | 9/2006 | Wright et al. | 277/413 |

FOREIGN PATENT DOCUMENTS

| | | |
|---|---|---|
| DE | 4107580 A1 | 9/1992 |
| EP | 0933566 A1 * | 8/1999 |
| FR | 1488517 A | 7/1967 |
| GB | 1195908 A | 6/1970 |

* cited by examiner

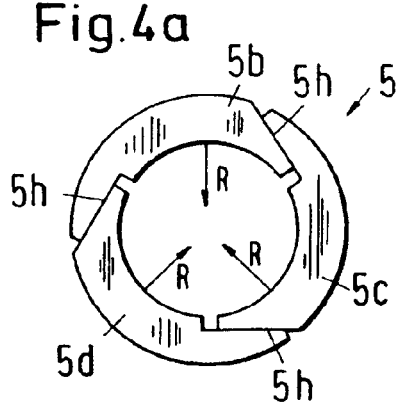
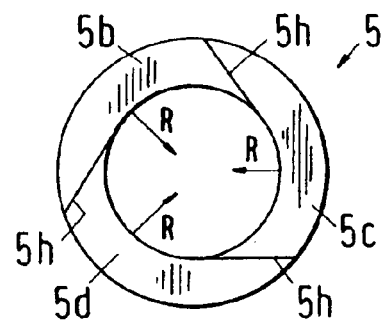
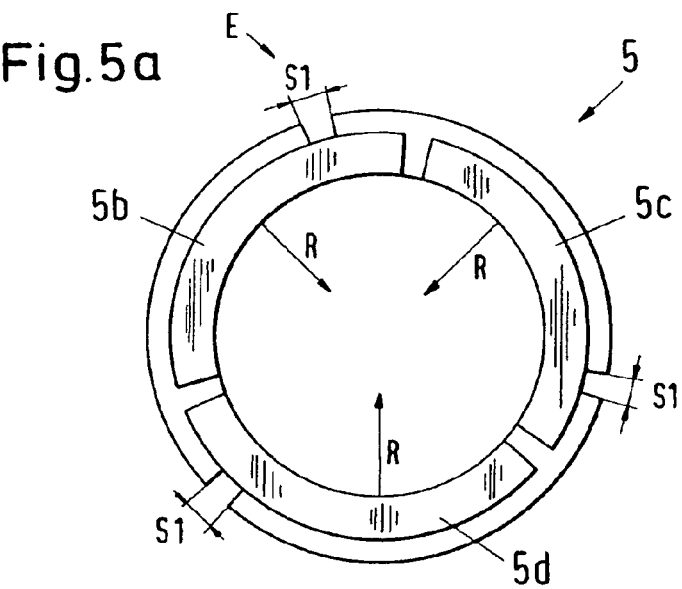
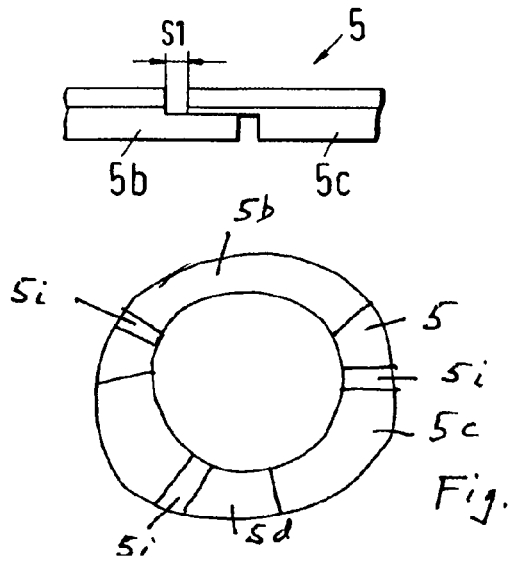
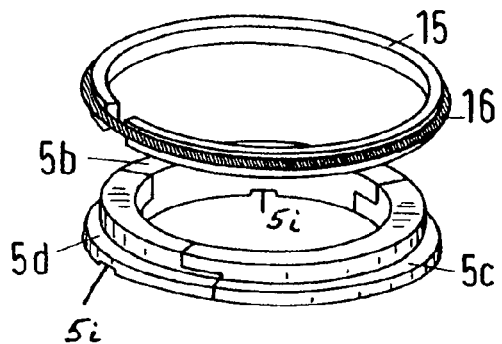

DRY-RUNNING PISTON ROD SEALING ARRANGEMENT, AND METHOD FOR SEALING A PISTON ROD USING ONE SUCH ARRANGEMENT

CROSS-REFERENCE TO RELATED APPLICATIONS

This application is a National Stage of International Application No. PCT/EP2005/055494, filed Oct. 24, 2005, which claims the benefit of EP Patent Application No. 04405656.2 filed Oct. 22, 2004, the disclosures of both of which applications are incorporated herein by reference.

BACKGROUND OF THE INVENTION

The invention relates to a dry-running piston rod sealing arrangement. The invention further relates to a method for the sealing of a piston rod having a dry-running piston rod sealing arrangement.

A dry-running piston rod sealing arrangement for a dry-running piston compressor having a longitudinally movable piston rod is known from the document EP 0933566 A1. This dry-running sealing arrangement includes sealing elements of a dry-running material such as carbon, graphite or plastic. The sealing element has a sealing surface which contacts the piston rod and forms a rubbing contact seal with respect to the piston rod in this way. This friction has the consequence of increasing wear of the sealing element; the sealing action of the sealing element is gradually reduced after a maximum permissible wear has been exceeded and the sealing element then has to be replaced relatively quickly. The friction of the sealing element on the piston rod moreover generates frictional heat which is difficult to dissipate, which has the consequence that the maximum pressure difference which can be sealed or the mean piston speed has to be restricted. The known piston rod sealing systems used for the oil-free sealing of gases, also termed a packing or dry-running sealing arrangement, are subjected to a high mechanical and thermal loading which has the disadvantageous consequence that the service life of the sealing elements, the maximum pressure difference which can be sealed and also the mean piston speed are restricted.

SUMMARY OF THE INVENTION

It is thus an object of the present invention to propose a more advantageous dry-running sealing arrangement and also an advantageous method for the sealing of a piston rod with a dry-running seal.

This object is satisfied with a dry-running sealing arrangement having the features of the embodiment disclosed herein. Further embodiments relate to further advantageously designed dry-running sealing arrangements. The object is further satisfied with a method having the features of the embodiment disclosed herein. Further embodiments relate to further advantageous method steps.

The object is in particular satisfied with a dry-running piston rod sealing arrangement for the sealing of a longitudinal movably supported piston rod comprising at least one sealing ring having a sealing surface, an actuator, a sensor and also a chamber ring within which the sealing ring is arranged, with the actuator having an operative connection with respect to the sealing ring such that the sealing surface can be radially displaced relative to the piston rod, and wherein the actuator can be controlled in dependence on a measured value detected by the sensor.

The dry-running sealing arrangement in accordance with the invention has the advantage that the position of the sealing element or its sealing surface with respect to the surface of the piston rod can be controlled with the help of an actuator and is thus variable so that, on the one hand, it is preferably avoided that the sealing surface contacts the piston rod and, on the other hand, the gap width between the sealing surface and the piston rod can be subjected to follow-up regulation, preferably such that the gap width is kept as small as possible.

In the method in accordance with the invention for the sealing of the longitudinal movably supported piston rod the position of the sealing elements is thus controllably changed in dependence on a measurable value of the dry-running piston rod sealing arrangement, also termed the control value. By way of example, one of the distance between the sealing surface and the piston rod surface, the temperature of the piston rod, the quantity of leakage gas, the contact pressure force of the sealing element on the piston rod or the pressure difference between two sealing elements is suitable as the control value. This control value is detected with the aid of a sensor. This control value is also directed to a regulating device. The regulating device controls the actuator and thus the position of the sealing element, i.e. the position of the sealing surface until the control value corresponds to a preset desired value. The position of the sealing surfaces is preferably controlled in such a way that the pressure drop across a sealing ring lies within a predetermined range of values or at a predetermined value. The position of the sealing surfaces can for example also be controlled in such a way that essentially the same pressure drop is present across each controllable sealing ring.

The position of the sealing element is preferably regulated in such a way that a contact-free gap seal with a small gap width of fractions of millimeters is maintained between the sealing surface and the piston rod, for example a gap width in the range between 0 and 0.3 mm. The sealing elements could also be controlled in such a way that a gap width of zero results in that the sealing surface of the sealing element contacts the piston rod without or with only a negligible small contact pressing force. Since the sealing element does not contact the piston rod, or hardly touches the piston rod, it has no wear or only an extremely low wear so that the sealing elements rarely have to be replaced and the dry-running sealing arrangement can preferably be operated in service-free manner for a longer period of time. The dry-running sealing arrangement in accordance with the invention has the advantage that the pressure difference can preferably be controlled across each sealing element. In this way a situation can in particular be avoided in which an excessively high pressure difference with correspondingly high wear is present across one or more sealing elements. It has been shown that for non-controllable sealing elements a specific sealing element frequently wears excessively and thereby become unfit for operation, whereby a further sealing element is exposed to excessive wear, so that through this resulting chain reaction the entire dry-running sealing arrangement becomes unusable relatively soon. The arrangement in accordance with the invention prevents such an uncontrolled chain reaction for sealing elements arranged following one another along the piston rod.

The dry-running sealing arrangement in accordance with the invention has the further advantage that the sealing surface of the sealing element does not or hardly touches the surface of the moving piston rod so that thereby no frictional heat or only a small frictional heat arises.

The dry-running sealing arrangement in accordance with the invention thus has a higher service-life for lower leakage and is in particular also suitable for high pressure differences and/or high average piston rod speeds or piston speeds. The dry-running sealing arrangement in accordance with the invention thus permits a dry-running compressor with a high pumping performance to be built. Moreover, the dry-running sealing arrangement in accordance with the invention is also suitable for the sealing of gases with a low molecular weight, such as for example hydrogen.

The invention will be described in the following with the aid of Figures.

BRIEF DESCRIPTION OF THE DRAWINGS

FIG. 4a is a front view of a further segmented sealing ring;

FIG. 4b is a front view of a further segmented sealing ring;

FIG. 5a is a front view of a further segmented sealing ring;

FIG. 5b is a detailed view of the point of overlap of the sealing ring in accordance with FIG. 5a;

FIG. 5c is the sealing ring in accordance with FIG. 5a with an elastic cover ring;

FIG. 5d is the sealing ring in accordance with FIG. 5c from the direction C;

DESCRIPTION OF THE PREFERRED EMBODIMENTS

Figure 1:
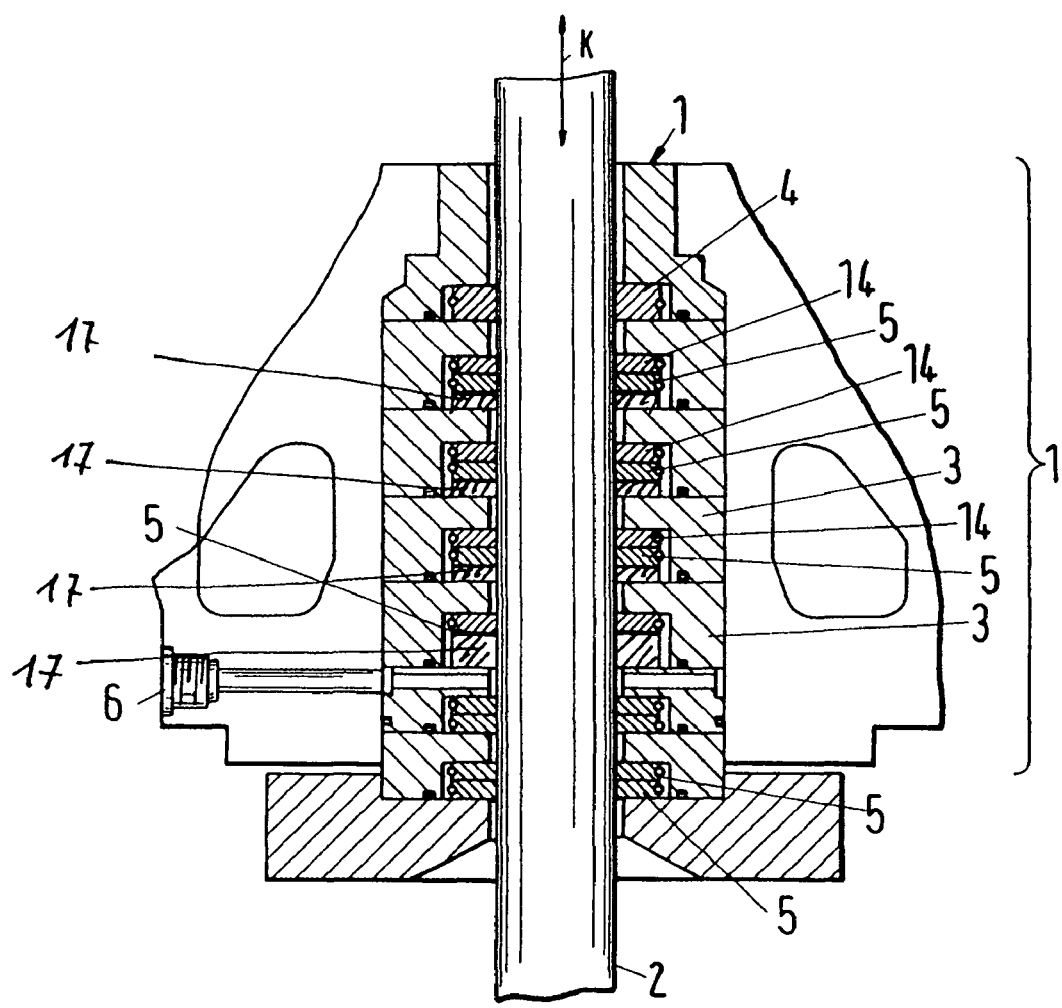
FIG. 1 is a piston rod seal of a dry-running piston compressor.

FIG. 1 shows a dry-running piston rod sealing arrangement 1 of a dry-running piston compressor having a piston rod 2 which is longitudinally movably supported in the direction of movement K, with the cylinder being located in the installed state at the side A and the piston rod drive at the side B. The dry-running sealing arrangement 1 is designed as a piston rod seal 1 having a packing, with the packing including a plurality of chamber rings 3 arranged in sequence with sealing rings 5 arranged therein. The dry-running sealing arrangement 1 includes a restrictor ring 4 and also a plurality of sealing rings 5. In an advantageous design, as is shown by the top three chamber rings 3, a cover ring 14, a sealing ring 5 and also a support ring 17 are arranged alongside one another in the direction of extent of the piston rod 2. Within the chamber ring 3 only a single sealing ring 5 can however also be provided, as shown in one chamber ring 3. The piston rod 2 moves to and fro in the direction K. The piston rod seal 1 moreover includes a leakage gas extraction 6.

Figure 2:
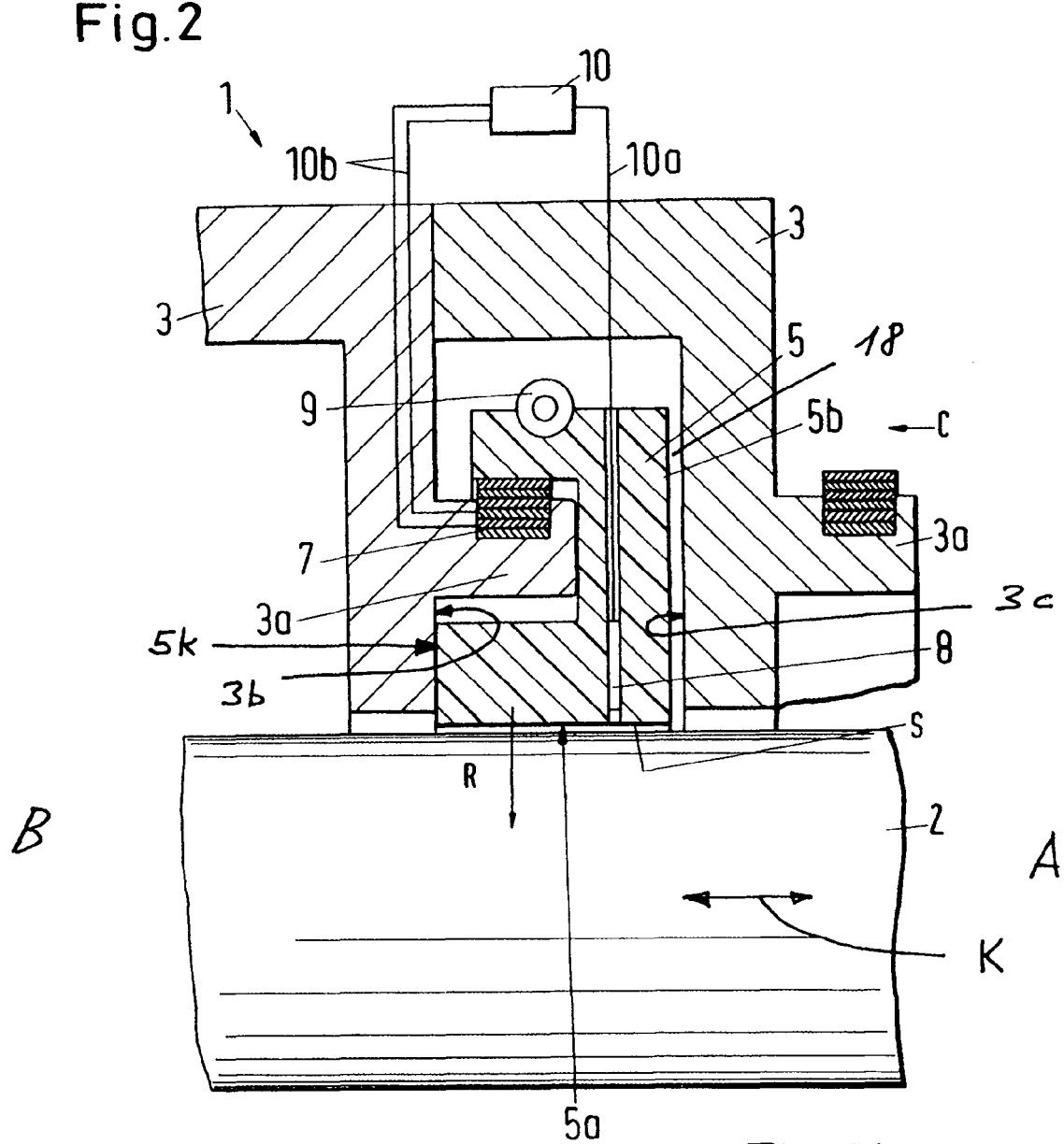
FIG. 2 is a partial view of a longitudinal section of a dry-running sealing arrangement.

FIG. 2 shows in a longitudinal section two chamber rings 3 and also a sealing ring 5 of the dry-running sealing arrangement 1 of the invention. The entire dry-running sealing arrangement 1 includes, as shown in FIG. 1, preferably a plurality of chamber rings 3 with sealing rings 5 arranged one behind the other in the direction of extent of the piston rod 2. The chamber ring 3 shown in FIG. 2 has a projecting, ring-like, chamber ring part 3a to which a piezoelectric actuator 7 is secured. The chamber ring 3 includes moreover two support surfaces 3b, 3c extending perpendicular to the longitudinal direction of the piston rod 2.

Figure 2A:
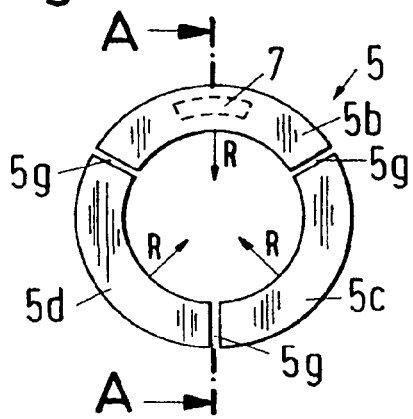
FIG. 2a is a front view of a segmented sealing ring from the direction C.

The sealing ring 5 is shown in FIG. 2a in a view from the direction C. The sealing ring 5 consists of three identically designed sealing ring segments 5b, 5c, 5d which are slightly spaced apart at the gap 5g. The gap 5g has for example a width in the range from 0.1 to 0.5 mm.

In FIG. 2a the actuator 7 which is associated with the sealing ring segment 5b is shown in broken lines. The actuator 7 is located, seen from the direction C, behind the sealing ring segment 5b. In analogy to this an actuator 7 is also associated with the sealing ring segments 5c, 5d, but is not however shown. Each sealing ring segment 5b, 5c, 5d thus has its own actuator 7 with the gap 5g being made so wide that the sealing ring segments 5b, 5c, 5d can be displaced in the radial direction R at least with respect to the piston rod 2.

FIG. 2 shows a section of the sealing ring segment 5b along the line A-A. The sealing ring 5, i.e. its sealing ring segments 5b, 5c, 5d, has a sealing surface 5a oriented towards the piston rod 2. The sealing ring shown in FIG. 2 is surrounded by spring 9 so that the sealing ring segments 5b, 5c, 5d are held together while forming the whole sealing ring 5. Three actuators 7 which are uniformly spaced apart in the peripheral direction are secured to the chamber ring part 3a, with each sealing ring segment 5b, 5c, 5d being connected to a respective actuator 7, so that each sealing ring segment 5b, 5c, 5d is displaceably supported in the radial direction R and can be controlled by one actuator each.

In the illustrated embodiment a sensor 8 is arranged inside at least one of the sealing ring segments 5b which detects the distance to the surface of the piston rod 2. The sensor 8 and also the actuator 7 are connected via electrical leads 10a to a regulating device 10. In the illustrated embodiment the regulating device 10 determines, with the aid of a sensor 8, the spacing between the surface of the piston rod 2 and preferably the sealing surface 5a, with the regulating device 10 controlling the actuator 7 and the sealing ring segment 5b, 5c, 5d connected to it in such a way that the gap width S adopts a desired value preset for the regulating device 10. Each sealing ring segment 5b, 5c, 5d is preferably connected to a separate actuator 7 so that the regulating device 10 controls three actuators 7 per sealing ring 5.

The section of the sealing ring segment 5b shown in FIG. 2 also shows that each sealing ring segment 5b, 5c, 5d preferably has an end face 5k which preferably projects as shown in the longitudinal direction of the piston rod 2 and has a profile matched relative to the support surface 3b. In the illustrated embodiment the end face 5k and also the contact surface 3b extend perpendicular to the longitudinal direction of the piston rod 2. The contact surface 3b and also the end face 5k could also extend in inclined manner with respect to the longitudinal direction of the piston rod 2. During the compression movement of the piston rod, for example of the non-illustrated piston, a higher pressure arises at the side designated by A. The contact surface 3b and the end face 5k have the advantages that all sealing ring segments 5b, 5c, 5d contact the contact surface 3b at least with the end face 5k and are thus laterally supported and that the gap 5g extending in a radial direction is covered over to a large part by the contact surface 3b which reduces the leakage in the direction of extent of the piston rod 2. The lateral support is in particular important in order to hold the sealing ring 5 in a defined position since, during the operation of the piston compressor, an oscillating dynamic pressure profile arises within the piston rod sealing arrangement with considerable pressure fluctuations which act on the sealing ring 5.

The sealing ring 5 can be arranged and designed such that a gap 18 results between the sealing ring 5 and the chamber ring 3, which permits a return flow of the fluid in the direction A during a suction phase of the piston compressor.

In an advantageous embodiment the pressure applied via a sealing ring 5 during the compression phase lies in the range between 50 and 75 bar. If two chamber rings 3 with the sealing rings 5 arranged therein are arranged after one another in the direction of extent of the longitudinal axis of the piston rod 2, the maximum pressure of this exemplary piston rod sealing arrangement 1 amounts to between 100 and 150 bar; i.e. the total maximum pressure when using four chamber rings 3 each having a sealing ring 5 lies between 200 and 300 bar.

Figure 2B:
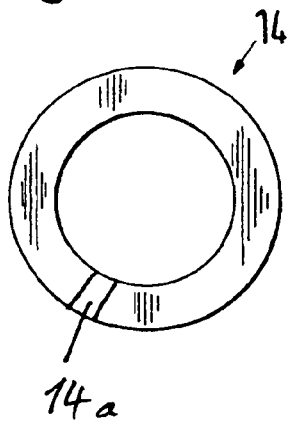
FIG. 2b is a front view of a passive cover ring seen from the direction C.

FIG. 2b shows a passive cover ring, that is to say, a non-actively actuatable cover ring 14. As shown in FIG. 1 the cover ring 14 is arranged alongside the sealing ring 5. In the example of FIG. 2 the cover ring 14 is arranged to the right, alongside the sealing ring 5, with the inner space of the chamber ring 3 then having to be made correspondingly large. The cover ring 14 covers the radial gaps 5g and thus prevents a gas escape in the direction of extent K of the piston rod 2. In order to avoid wear of this passive sealing ring 14 its internal diameter is made sufficiently large that no contact with the piston rod 2 results. The cover ring 14 can have a return flow groove 14a in a preferred design, with the cover ring 14 being arranged such that the return flow groove 14a is aligned towards the side A.

Figure 2C:
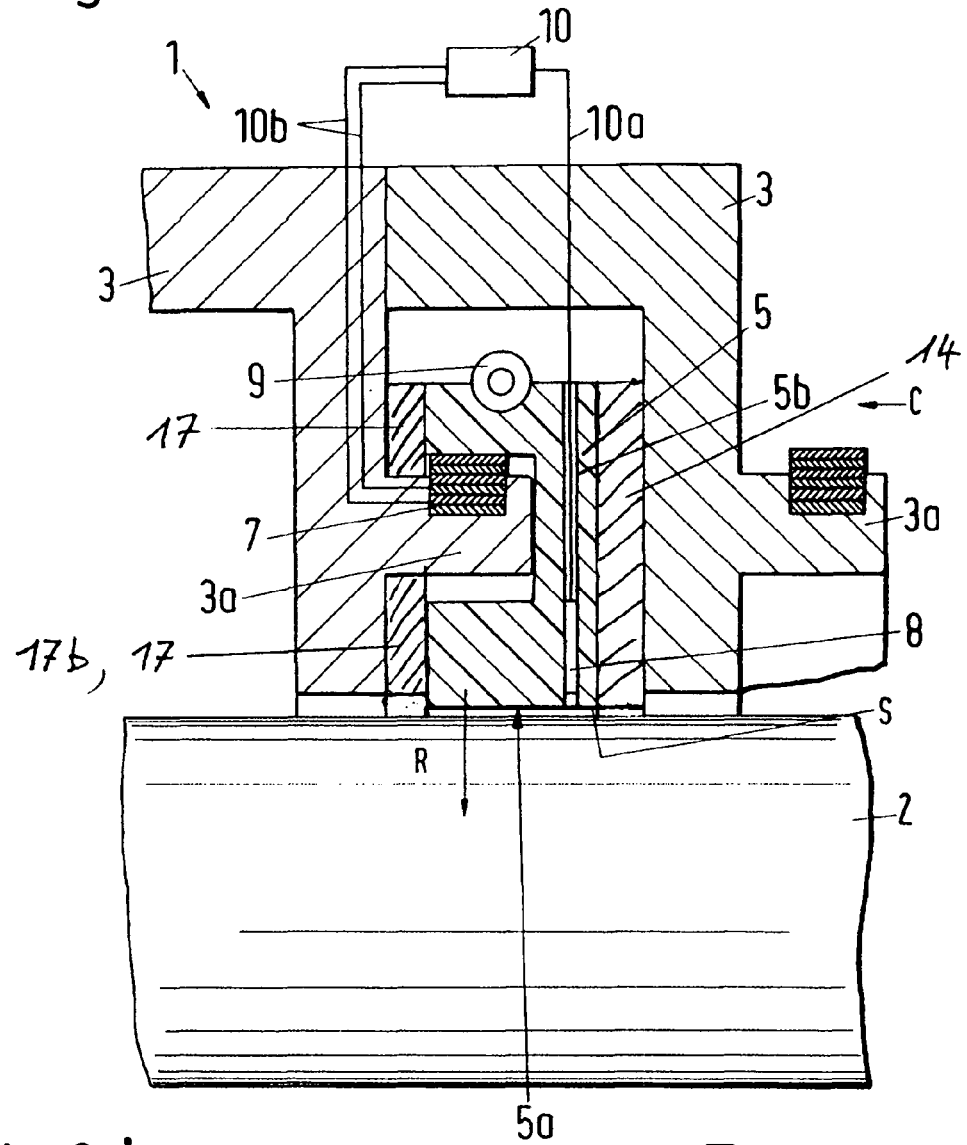
FIG. 2c is a partial view of a longitudinal section of a further embodiment of a dry-running sealing arrangement.
Figure 2D:
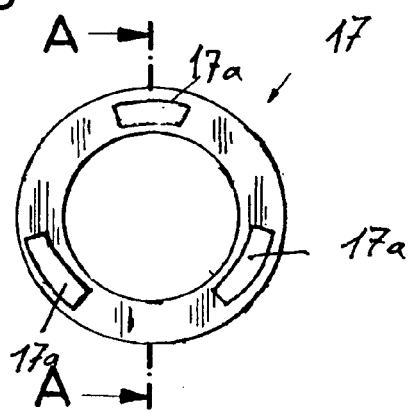
FIG. 2d is a front view of a support ring seen from the direction C.

FIG. 2c shows in a longitudinal section a further embodiment of a dry-running sealing arrangement which, in distinction to the embodiment of FIG. 2, includes a cover ring 14 and a support ring 17. The support ring 17 serves as a support for the sealing ring 5 in the direction of the longitudinal axis of the piston rod 2, with the support ring 17 having apertures 17a as shown in the plan view of FIG. 2d through which the projecting chamber ring parts 3a extend.

The support ring 17 could also be designed in such a way that it only includes a circular disc designated by 17b in FIG. 2c, the peripheral surface of which partly contacts the projecting chamber ring part 3a.

Figure 2E:
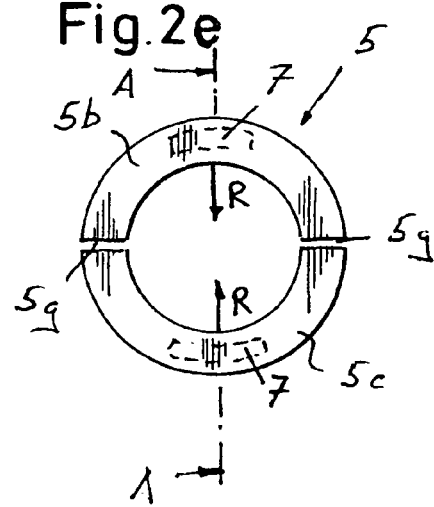
FIG. 2e is a front view of a further embodiment of a segmented sealing ring seen from the direction C.

The sealing ring 5 could also, as shown in the plan view in FIG. 2e, consist only of two sealing ring segments 5b, 5c which are each displaceably supported in the radial direction R via one actuator 7 each.

Figure 3:
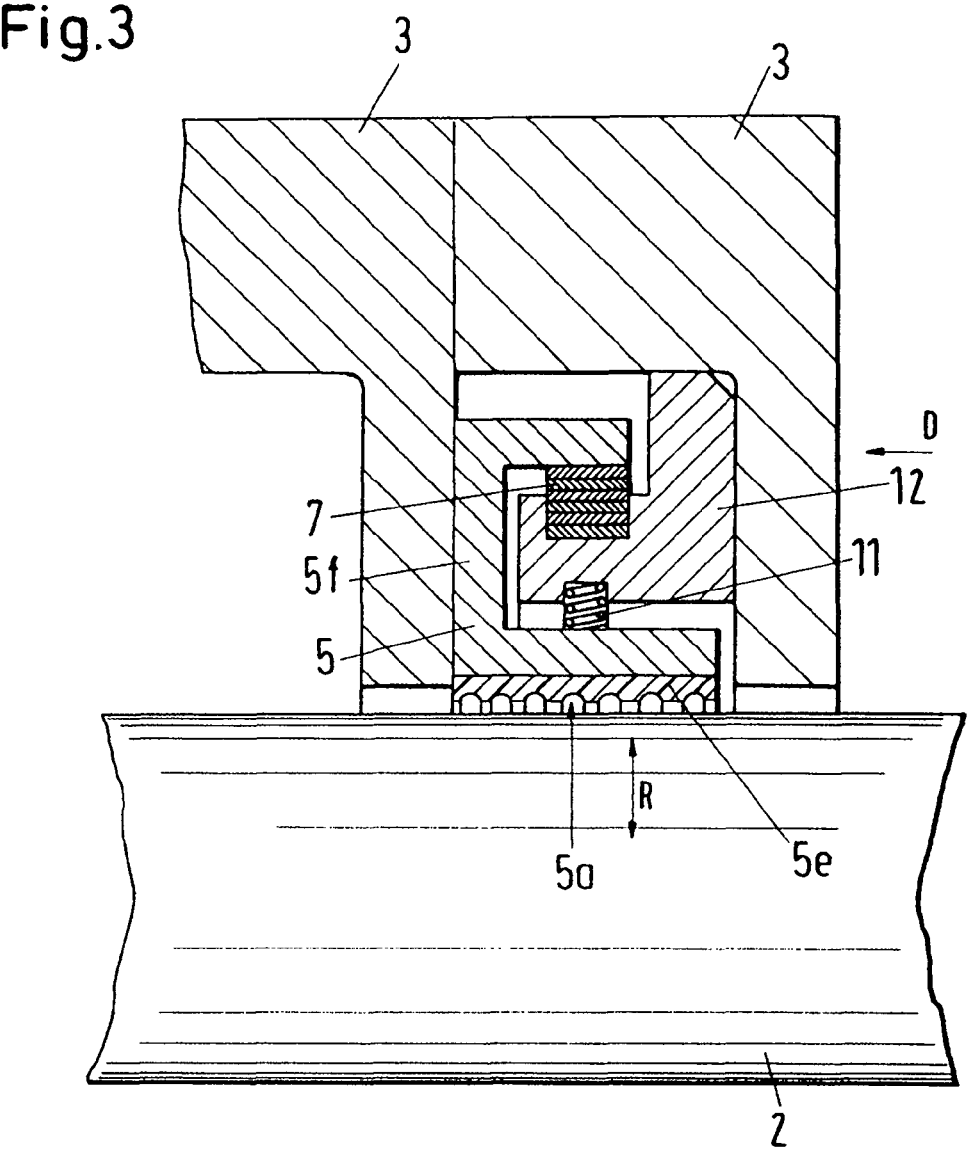
FIG. 3 is a partial view of a further longitudinal section of a dry-running sealing arrangement.

FIG. 3 shows in a partial view a further longitudinal section through an embodiment of the chamber ring 3 with sealing ring 5, with the sensor 8 and also the regulating device 10 not being shown. A ring-like holder 12 is arranged in the inner space of the chamber ring 3 to which the piezoelectric actuator 7 and also a spring 11 are connected. The sealing ring 5 is now designed such that this contacts both the actuator 7 and also the spring 11. The actuator 7 is in turn actuatable in such a way that the sealing ring 5 and thus the sealing surface 5a is displaceably mounted in the radial direction R to the piston rod 2. The embodiment of the sealing ring 5 shown in FIG. 3 has a sealing layer 5e with labyrinth grooves facing towards the piston rod 2 so that a sealing surface 5a having labyrinth grooves results. The actuator 7 is preferably controlled in such a way that a small gap continually exists between the surface of the piston rod 2 and the sealing surface 5a so that a gap seal results, with the labyrinth grooves additionally increasing the sealing action. The entire sealing ring 5 could consist of the same material. The sealing ring 5 can also consist, as shown in FIG. 3, of a base ring 5f and also a sealing layer 5e with the sealing layer consisting of a different material with respect to that of the base ring 5f. The base ring 5f could for example consist of a metal and the sealing layer 5e of a material capable of dry-running such as plastic or ceramic.

Figure 3A:
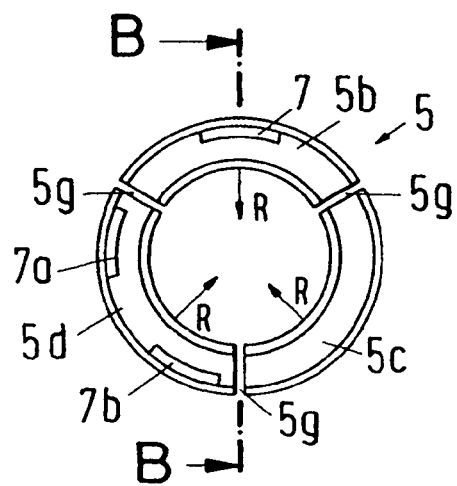
FIG. 3a is a front view of a segmented sealing ring seen from the direction D.

FIG. 3a shows a front view of the sealing ring 5 shown in FIG. 3 from the direction D. The sealing ring 5 is designed as a segmented sealing ring with radial gaps 5g and includes three sealing ring segments 5b, 5c, 5d. FIG. 3 shows a section through the sealing ring in accordance with FIG. 3a along the line B-B. The actuator 7 is schematically illustrated for the sealing ring segment 5b. Each sealing ring segment 5b, 5c, 5d preferably has an actuator 7 arranged in this way. In a further embodiment two actuators 7a, 7b could be associated with each sealing ring segment as shown for the sealing ring segment 5d, with the two actuators jointly acting on the sealing ring segment 5d so that it is displaceable in the direction R.

Differently designed sealing rings 5 can be used in combination with the dry-running sealing arrangement 1 in accordance with the invention. FIGS. 4a, 4b and 5a each show a front view of differently designed sealing rings 5, with the point of action for the actuators 7 being located, as also shown in FIG. 2a, at the rear side of the sealing ring segments 5b, 5c, 5d and thus not being directly visible in the illustrated view.

The sealing ring 5 in accordance with FIG. 4a has cuts 5h along which the sealing ring segments 5b, 5c, 5d are displaceably mounted in order to move them in the direction R.

The sealing ring in accordance with FIG. 4b has tangentially extending cuts 5h with respect to the piston rod 2. The sealing ring segments 5b, 5c, 5d are preferably displaceable parallel to the course of the cuts 5h in the direction R. The two sealing rings 5 shown in FIGS. 4a and 4b are preferably used in combination with a cover ring 14.

The sealing ring 5 in accordance with FIG. 5a consists of three sealing ring segments 5b, 5c, 5d, which, as shown in FIG. 5b, each have a point of abutment S1 overlapping in the peripheral direction. Each sealing ring segment 5b, 5c, 5d is connected, for example as shown in FIG. 2 or FIG. 3, via an actuator 7 to the respective chamber ring 3 and is displaceable in the radial direction R. It can prove advantageous to provide the sealing ring 5, as shown in FIG. 5c, with a peripherally extending elastic sealing ring 15 which seals off the points of abutment in the radial direction. For this arrangement no additional adjacently disposed cover ring 14 is required as is shown in FIG. 1 with the individual sealing ring 4 arranged in the chamber ring 3. The sealing ring 15 can, as shown, be surrounded by an elastic spring 16. The sealing ring 5 can, as shown in FIGS. 5c and 5d, have return flow grooves 5i extending in the radial direction, with the sealing ring 5 being arranged such that the return flow grooves 5i point to the side A shown in FIG. 2.

Figure 6:
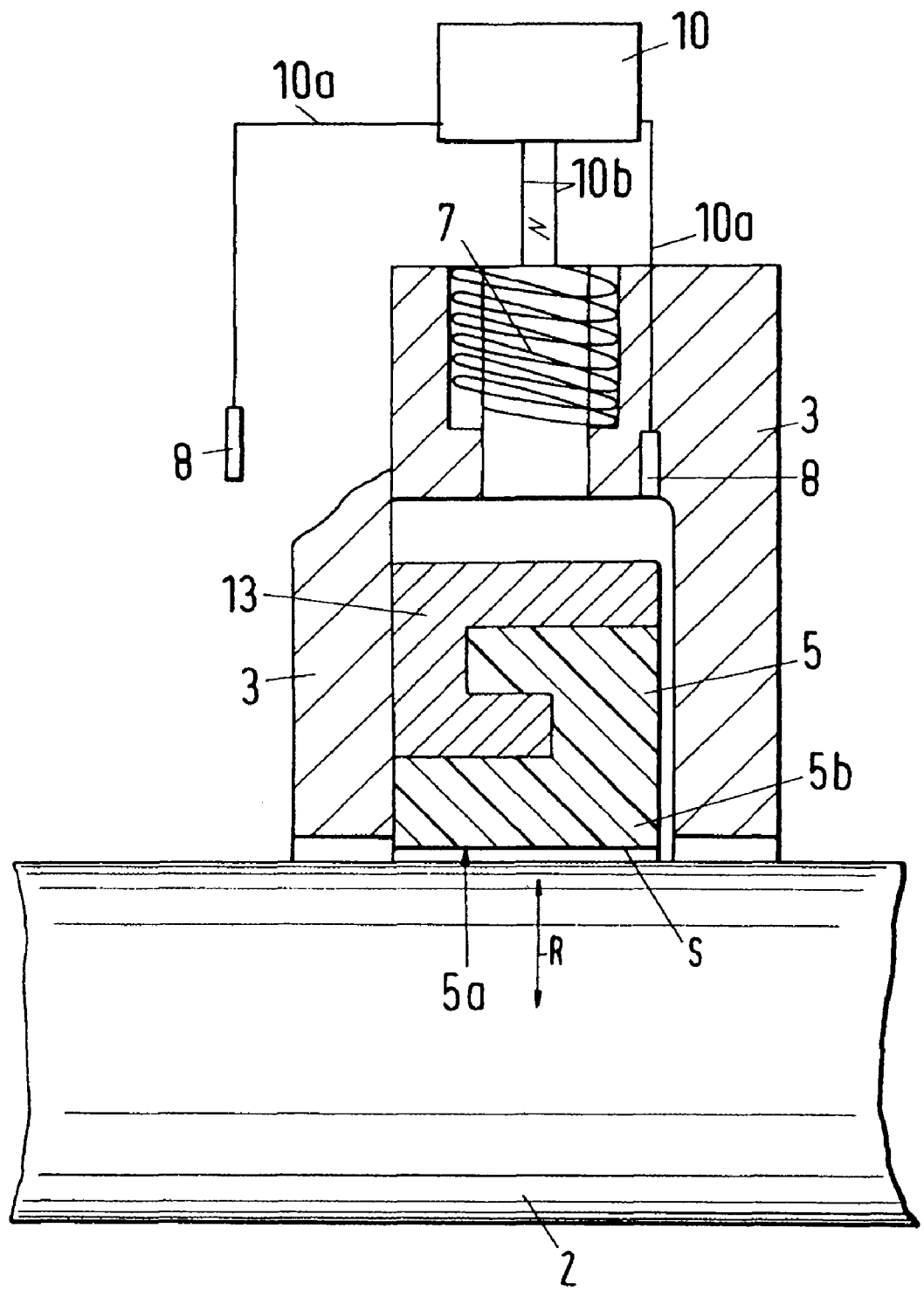
FIG. 6 is a partial view of a further longitudinal section of a dry-running sealing arrangement.

FIG. 6 shows, in a partial view, a further longitudinal section through an embodiment of a chamber ring 3 with the sealing ring 5 and a sensor 8 arranged in the chamber ring 3 which detects the pressure within the chamber ring 3. An actuator 7 designed as an electro-magnet with a coil is arranged in the chamber ring 3. Similar to the way shown in FIG. 2a the sealing ring 5 is designed as a segmented ring consisting of three sealing ring segments 5b, 5c, 5d. Each sealing ring segment 5b, 5c, 5d is connected to a metallic magnetizable holder 13. Through an actuation of the actuator 7 each sealing ring segment can be individually displaced in the radial direction R so that the gap width S can be adjusted.

FIG. 6 shows at the left a further sensor 8 which is arranged in the left-hand chamber ring 3, which is merely indicated. Both sensors 8 and also the actuators 7 are connected via the leads 10a, 10b to the regulating device 10. In the illustrated embodiment the pressure in the chamber rings 3 is detected with the aid of the sensors 8 as a control value, and a position of the sealing ring segments 5b, 5c, 5d is preferably controlled in such a way that a preset desired pressure difference sets in neighboring chamber rings 3 or so that a preset desired pressure difference is not exceeded.

Figure 7:
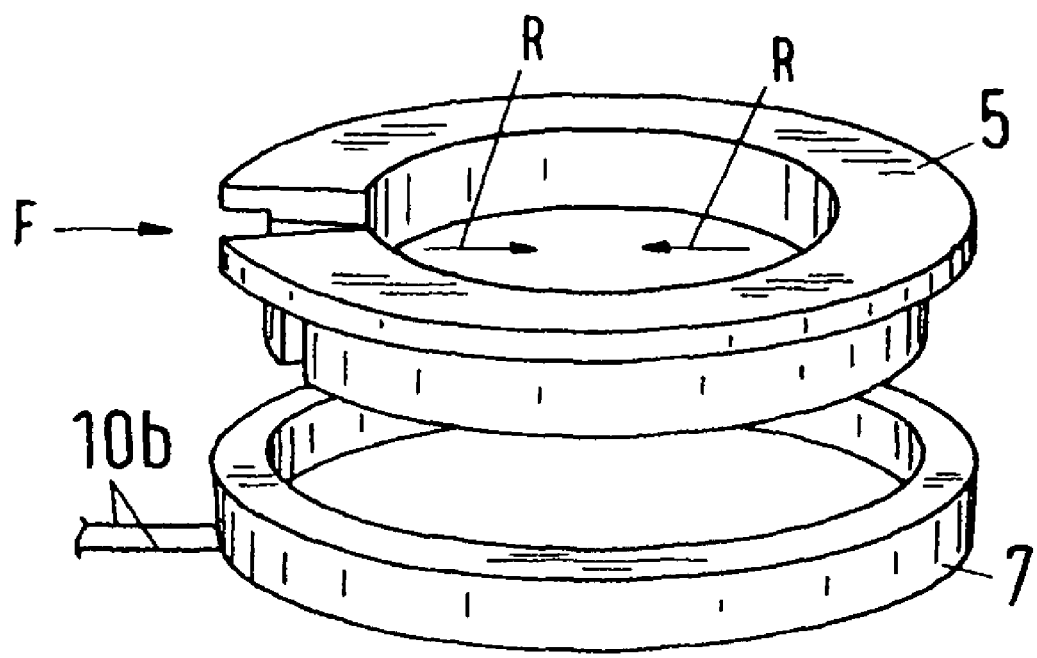
FIG. 7 is a view of a one-piece sealing ring.
Figure 7A:
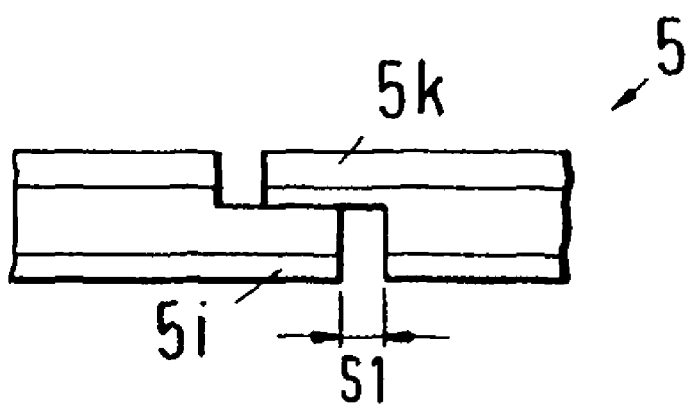
FIG. 7a is a detailed view of the point of overlap of the sealing ring in accordance with FIG. 7.

FIG. 7 shows a one-piece sealing ring 5 with overlapping joints 5i, 5k. FIG. 7a shows these joints 5i, 5k and also the gap S1 in a side view from the viewing direction F. The sealing ring 5 is surrounded by a ring-like or tube-like actuator 7 whose peripheral length can be controllably extended or shortened, for example piezoelectrically, so that the sealing surface 5a of the sealing ring 5 in turn experiences a shift in the radial direction R relative to the piston rod 2 so that the gap width S can also be controlled and changed. The electrical leads 10b serve for the control of the piezoelectric actuator 7.

All the sealing rings 5 of the dry-running sealing arrangement 1 preferably each have at least one actuator 7. If the sealing ring 5 consists of sealing ring segments 5b, 5c, 5d then each sealing ring 5 preferably has its own actuator 7 for each sealing ring segment 5b, 5c, 5d. The regulating device 10 preferably controls all actuators 7 of the dry-running sealing arrangement 1, with the regulating device 10 detecting the values of a plurality of sensors 8 arranged in the dry-running sealing arrangement 1.

The actuators 7 could also be designed, in addition to the illustrated embodiments operating with electrical energy, in such a way that these can be operated by flow energy, for example pneumatically or hydraulically, in order to generate a stroke movement. The adjustment path, i.e. the displacement path in the radial direction R which can be brought about by an actuator 7, preferably lies in the range from a few tenths of a millimeter up to about one millimeter.

A plurality of sensors are suitable as the sensors 8. For the measuring of the spacing between the piston rod 2 and the sealing ring segment 5b, 5c, 5d an inductive pick-up transducer is for example suitable.

The piston rod temperature serves as an indicator of the friction heat which is produced by the sealing system. In a possible regulating method the spacing between the sealing ring 6 and the piston rod 2 is slightly increased with a rise of the piston rod temperature until the temperature falls again. The measurement of the piston rod temperature can for example take place through a contact measurement by means of a sliding shoe, but preferably however in contact-free manner, for example with an infrared sensor or with a sensor arranged on the piston rod 2 the values of which can be transferred in contact-free manner. It can also prove advantageous to measure the mass flow at the leakage gas extraction 6, for example with a thermal mass flow transducer. The actuators 7 could for example be controlled in such a way that a minimum quantity of gas at the leakage gas extraction is not fallen short of.

In contrast to the passive cover ring 14 shown in FIG. 2b, the cover ring 14 could also be designed as an actively controllable cover ring 14, for example in the same way as the sealing ring 5 shown in FIG. 3a. Thus, a sealing ring 5 and a controllable cover ring 14 could be jointly arranged lying alongside one another in a chamber ring 3 in that, for example, the arrangements illustrated in FIGS. 2 and 3 are jointly arranged within a chamber ring 3 for the control of one sealing ring 5 in each case, with the sealing ring 5 shown in FIG. 3 executing the function of a cover ring 14 in that it is arranged such that the joints 5g of the sealing ring 5 are covered over so that the sealing ring and the cover ring 5, 14 lie alongside one another and can be individually controlled via the respective actuator 7.

In an advantageous operating method the sealing ring 5 can be controlled in a first operating phase in such a way that the sealing surfaces 5a contact the piston rod 2 so that the sealing surfaces 5a wear against the piston rod 2 and thereby adopt the shape of the piston rod 2. In a second operating phase the sealing ring 5 could be controlled in such a way that a predefined gap exists between the sealing surfaces 5a and the piston rod 2. Since the run of the sealing surfaces 5a is matched to the run of the piston rod 2 in the second operating phase, the predefined gap can be kept very small so that a small leakage results in the longitudinal axis of the piston rod 2.

The invention claimed is:

1. Dry-running piston rod sealing arrangement for the sealing of a longitudinal movably supported piston rod comprising at least one sealing ring having a sealing surface, an actuator, a sensor and also a chamber ring within which the sealing ring is arranged, with the actuator having an operative connection with respect to the sealing ring such that the sealing surface can be radially displaced relative to the piston rod, and wherein the actuator can be controlled in dependence on a measured value detected by the sensor such that there is a gap width between the sealing surface and the piston rod and such that the actuator allows control of the gap width, wherein the sealing ring is formed as a segmented sealing ring comprising a plurality of sealing ring segments.

2. Piston rod sealing arrangement in accordance with claim 1, wherein a plurality of chamber rings are arranged in the longitudinal direction of the piston rod with one sealing ring and an actuator being arranged within at least two chamber rings.

3. Piston rod sealing arrangement in accordance with claim 2, wherein the chamber ring has a support surface extending perpendicular to the longitudinal direction of the piston rod.

4. Piston rod sealing arrangement in accordance with claim 3, wherein a cover ring and a support ring are arranged beside the sealing ring in the direction of extent of the piston rod.

5. Piston rod sealing arrangement in accordance with claim 1, wherein at least one separate actuator is associated with each sealing ring segment.

6. Piston rod sealing arrangement in accordance with claim 1, wherein the sealing ring comprises return flow grooves extending in the radial direction.

7. Piston rod sealing arrangement in accordance with claim 1, wherein the actuator is designed as a piece of piezoelectric element or magnetostrictive element.

8. Piston rod sealing arrangement in accordance with claim 1, wherein the actuator can be driven by means of a fluid.

9. Piston rod sealing arrangement in accordance with claim 1, wherein the sensor is secured to the sealing ring.

10. Piston rod sealing arrangement in accordance with claim 1, wherein the sealing surface has labyrinth grooves.

11. Dry-running compressor comprising a piston rod sealing arrangement in accordance with claim 1.

12. Method for the sealing of a longitudinal movably supported piston rod having a dry-running piston rod sealing arrangement comprising at least two sealing rings with a sealing surface, the sealing rings being arranged spaced apart in the longitudinal direction of the piston rod, wherein the position of the sealing surface with respect to the piston rod can be controllably changed in dependence on a control value, to control the gap width between the sealing surface and the piston rod.

13. Method in accordance with claim 12, wherein at least two and preferably all sealing rings can be controlled in such a way that the position of the sealing surfaces with respect to the piston rod can be changed.

14. Method in accordance with claim 12, wherein the spacing of the sealing ring from the piston rod and/or the temperature of the piston rod and/or the pressure difference between two sealing rings is used as the control value.

15. Method in accordance with claim 12, wherein the position of the sealing surfaces of two sealing rings arranged spaced apart in the longitudinal direction of the piston rod is controlled such that the pressure drop across one sealing ring lies within a preset range of values.

16. Method in accordance with claim 15, wherein the position of the sealing surfaces is controlled in such a way that essentially the same pressure drop arises over each controllable sealing ring.

17. Dry-running compressor comprising a piston rod sealing arrangement in accordance with claim 12.

18. Method in accordance with claim 12, wherein the position of the sealing surface is controlled such that a contact between the sealing surface and the piston rod is avoided.

19. Method in accordance with claim 12, wherein the sealing ring is formed as a segmented sealing ring comprising a plurality of sealing ring segments, and wherein the position of each sealing ring segment can controllably be changed.

* * * * *